(12) United States Patent
Huynh et al.

(10) Patent No.: US 7,338,018 B2
(45) Date of Patent: Mar. 4, 2008

(54) SYSTEMS AND METHODS FOR CONTROLLING AIRCRAFT FLAPS AND SPOILERS

(75) Inventors: Neal V. Huynh, Seattle, WA (US);
Robert J. Bleeg, Seattle, WA (US);
Ralph Scott Pepper, Seattle, WA (US);
John A. Standley, Seattle, WA (US);
Brian L. Bocksch, Seattle, WA (US)

(73) Assignee: The Boeing Company, Chicago, IL (US)

( * ) Notice: Subject to any disclaimer, the term of this patent is extended or adjusted under 35 U.S.C. 154(b) by 175 days.

(21) Appl. No.: 11/051,738

(22) Filed: Feb. 4, 2005

(65) Prior Publication Data

US 2006/0175468 A1    Aug. 10, 2006

(51) Int. Cl.
*B64C 9/06* (2006.01)
*B64C 9/18* (2006.01)
*B64C 9/32* (2006.01)

(52) U.S. Cl. ..................... 244/215; 244/99.2

(58) Field of Classification Search ........ 244/210–217, 244/99.1–99.3
See application file for complete search history.

(56) References Cited

U.S. PATENT DOCUMENTS

| 1,724,456 A | 8/1929 | Crook |
| 1,770,575 A | 7/1930 | Ksoll |
| 2,086,085 A | 7/1937 | Lachmann et al. |
| 2,169,416 A | 8/1939 | Griswold |
| 2,282,516 A | 5/1942 | Hans et al. |
| 2,289,704 A | 7/1942 | Grant |
| 2,319,383 A | 5/1943 | Zap |
| 2,347,230 A | 4/1944 | Zuck |
| 2,358,985 A | 9/1944 | McAndrew |
| 2,378,528 A | 6/1945 | Arsandaux |
| 2,383,102 A | 8/1945 | Zap |

(Continued)

FOREIGN PATENT DOCUMENTS

DE            387 833         1/1924

(Continued)

OTHER PUBLICATIONS

U.S. Appl. No. 60/475,828, Beyer.

(Continued)

*Primary Examiner*—Rob Swiatek
(74) *Attorney, Agent, or Firm*—Perkins Coie LLP

(57) ABSTRACT

Systems and methods for controlling aircraft flaps and spoilers. Systems in accordance with some embodiments include a wing having a trailing edge, and a flap positioned proximate to the wing trailing edge and being deployable relative to the wing between a first flap position and a second flap position by operation of a first actuator. A spoiler can be positioned at least proximate to the trailing edge and can be movable among at least three positions, including a first spoiler position in which the spoiler forms a generally continuous contour with an upper surface of the wing, a second spoiler position deflected downwardly from the first, and a third spoiler position deflected upwardly from the first. A second actuator can be operatively coupled to the spoiler to move the spoiler among the first, second and third spoiler positions in a manner that is mechanically independent of the motion of the flap.

5 Claims, 4 Drawing Sheets

U.S. PATENT DOCUMENTS

| | | |
|---|---|---|
| 2,385,351 A | 9/1945 | Davidsen |
| 2,387,492 A | 10/1945 | Blaylock et al. |
| 2,389,274 A | 11/1945 | Pearsall et al. |
| 2,406,475 A | 8/1946 | Rogers |
| 2,422,296 A | 6/1947 | Flader et al. |
| 2,444,293 A | 6/1948 | Holt |
| 2,458,900 A | 1/1949 | Erny |
| 2,504,684 A | 4/1950 | Harper |
| 2,518,854 A | 8/1950 | Badenoch |
| 2,563,453 A | 8/1951 | Briend |
| 2,652,812 A | 9/1953 | Fenzl |
| 2,665,084 A | 1/1954 | Feeney et al. |
| 2,851,229 A | 9/1958 | Clark |
| 2,864,239 A | 12/1958 | Taylor |
| 2,877,968 A | 3/1959 | Granan et al. |
| 2,886,008 A | 5/1959 | Geyer et al. |
| 2,891,740 A | 6/1959 | Campbell |
| 2,892,312 A | 6/1959 | Allen et al. |
| 2,899,152 A | 8/1959 | Weiland |
| 2,912,190 A | 11/1959 | MacDonough |
| 2,920,844 A | 1/1960 | Marshall et al. |
| 2,938,680 A | 5/1960 | Greene et al. |
| 2,990,144 A | 6/1961 | Hougland |
| 2,990,145 A | 6/1961 | Hougland |
| 3,013,748 A | 12/1961 | Westburg |
| 3,089,666 A | 5/1963 | Quenzler |
| 3,102,607 A | 9/1963 | Roberts |
| 3,112,089 A | 11/1963 | Dornier |
| 3,136,504 A | 6/1964 | Carr |
| 3,166,271 A | 1/1965 | Zuck |
| 3,203,275 A | 8/1965 | Hoover |
| 3,203,647 A | 8/1965 | Alvarez-Calderon |
| 3,263,946 A | 8/1966 | Roberts et al. |
| 3,282,535 A | 11/1966 | Steiner |
| 3,375,998 A | 4/1968 | Alvarez-Calderon |
| 3,423,858 A | 1/1969 | Speno |
| 3,447,763 A | 6/1969 | Allcock |
| 3,504,870 A | 4/1970 | Cole et al. |
| 3,528,632 A | 9/1970 | Miles et al. |
| 3,539,133 A | 11/1970 | Robertson |
| 3,556,439 A | 1/1971 | Autry et al. |
| 3,589,648 A * | 6/1971 | Gorham et al. ............ 244/186 |
| 3,642,234 A | 2/1972 | Kamber et al. |
| 3,653,611 A | 4/1972 | Trupp et al. |
| 3,659,810 A | 5/1972 | Robertson |
| 3,677,504 A | 7/1972 | Schwarzler |
| 3,704,828 A | 12/1972 | Studer et al. |
| 3,704,843 A | 12/1972 | Jenny |
| 3,711,039 A | 1/1973 | James |
| 3,730,459 A | 5/1973 | Zuck |
| 3,743,219 A | 7/1973 | Gorges |
| 3,767,140 A * | 10/1973 | Johnson ..................... 244/216 |
| 3,794,276 A | 2/1974 | Maltby et al. |
| 3,804,267 A | 4/1974 | Cook et al. |
| 3,807,447 A | 4/1974 | Masuda |
| 3,827,658 A | 8/1974 | Hallworth |
| 3,831,886 A | 8/1974 | Burdges et al. |
| 3,836,099 A | 9/1974 | O'Neill et al. |
| 3,837,601 A | 9/1974 | Cole |
| 3,862,730 A | 1/1975 | Heiney |
| 3,874,617 A * | 4/1975 | Johnson ..................... 244/216 |
| 3,897,029 A | 7/1975 | Calderon |
| 3,904,152 A | 9/1975 | Hill |
| 3,910,530 A | 10/1975 | James et al. |
| 3,913,450 A | 10/1975 | MacGregor |
| 3,917,192 A | 11/1975 | Alvarez-Calderon |
| 3,931,374 A | 1/1976 | Moutet nee Layrisse et al. |
| 3,941,334 A | 3/1976 | Cole |
| 3,941,341 A | 3/1976 | Brogdon, Jr. |
| 3,949,957 A | 4/1976 | Portier et al. |
| 3,968,946 A | 7/1976 | Cole |
| 3,985,319 A | 10/1976 | Dean et al. |
| 3,987,983 A | 10/1976 | Cole |
| 3,991,574 A | 11/1976 | Frazier |
| 3,993,584 A | 11/1976 | Owen et al. |
| 3,994,451 A | 11/1976 | Cole |
| 4,011,888 A | 3/1977 | Whelchel et al. |
| 4,015,787 A | 4/1977 | Maieli et al. |
| 4,106,730 A * | 8/1978 | Spitzer et al. ............... 244/183 |
| 4,117,996 A | 10/1978 | Sherman |
| 4,120,470 A | 10/1978 | Whitener |
| 4,131,253 A | 12/1978 | Zapel |
| 4,146,200 A | 3/1979 | Borzachillo |
| 4,171,787 A | 10/1979 | Zapel |
| 4,180,222 A | 12/1979 | Thornburg |
| 4,181,275 A * | 1/1980 | Moelter et al. ............. 244/213 |
| 4,189,120 A | 2/1980 | Wang |
| 4,189,121 A | 2/1980 | Harper et al. |
| 4,189,122 A | 2/1980 | Miller |
| 4,200,253 A | 4/1980 | Rowarth |
| 4,202,519 A | 5/1980 | Fletcher |
| 4,240,255 A | 12/1980 | Benilan |
| 4,262,868 A | 4/1981 | Dean |
| 4,275,942 A | 6/1981 | Steidl |
| 4,283,029 A | 8/1981 | Rudolph |
| 4,285,482 A | 8/1981 | Lewis |
| 4,293,110 A | 10/1981 | Middleton et al. |
| 4,312,486 A | 1/1982 | McKinney |
| 4,351,502 A | 9/1982 | Statkus |
| 4,353,517 A | 10/1982 | Rudolph |
| 4,358,077 A | 11/1982 | Coronel |
| 4,360,176 A | 11/1982 | Brown |
| 4,363,098 A | 12/1982 | Buus et al. |
| 4,365,774 A | 12/1982 | Coronel |
| 4,368,937 A | 1/1983 | Palombo |
| 4,384,693 A | 5/1983 | Pauly |
| 4,427,168 A | 1/1984 | McKinney |
| 4,441,675 A | 4/1984 | Boehringer |
| 4,444,368 A | 4/1984 | Andrews |
| 4,448,375 A | 5/1984 | Herndon |
| 4,459,084 A | 7/1984 | Clark |
| 4,461,449 A | 7/1984 | Turner |
| 4,471,925 A | 9/1984 | Kunz |
| 4,471,927 A | 9/1984 | Rudolph |
| 4,472,780 A * | 9/1984 | Chenoweth et al. ............ 701/4 |
| 4,475,702 A | 10/1984 | Cole |
| 4,479,620 A | 10/1984 | Rogers et al. |
| 4,485,992 A | 12/1984 | Rao |
| 4,496,121 A | 1/1985 | Berlin |
| 4,498,646 A | 2/1985 | Proksch |
| 4,528,775 A | 7/1985 | Einarsson |
| 4,533,096 A | 8/1985 | Baker et al. |
| 4,542,869 A * | 9/1985 | Brine .......................... 244/216 |
| 4,544,117 A | 10/1985 | Schuster |
| 4,553,722 A | 11/1985 | Cole |
| 4,575,030 A | 3/1986 | Gratzer |
| 4,575,099 A | 3/1986 | Nash |
| 4,576,347 A | 3/1986 | Opsahl |
| 4,605,187 A | 8/1986 | Stephenson |
| 4,637,573 A | 1/1987 | Perin |
| 4,650,140 A | 3/1987 | Cole |
| 4,691,879 A | 9/1987 | Greene |
| 4,700,911 A | 10/1987 | Zimmer |
| 4,702,441 A | 10/1987 | Wang |
| 4,702,442 A | 10/1987 | Weiland et al. |
| 4,706,913 A | 11/1987 | Cole |
| 4,712,752 A | 12/1987 | Victor |
| 4,717,097 A | 1/1988 | Sepstrup |
| 4,720,066 A * | 1/1988 | Renken et al. ............... 244/213 |
| 4,729,528 A | 3/1988 | Borzachillo |
| 4,747,375 A | 5/1988 | Williams |
| 4,779,822 A | 10/1988 | Burandt et al. |
| 4,784,355 A | 11/1988 | Brine |
| 4,786,013 A | 11/1988 | Pohl |

| | | | | | | |
|---|---|---|---|---|---|---|
| 4,789,119 A | 12/1988 | Bellego et al. | 6,213,433 B1 | 4/2001 | Gruensfelder | |
| 4,796,192 A | 1/1989 | Lewis | 6,227,498 B1 | 5/2001 | Arata | |
| 4,823,836 A | 4/1989 | Bachmann et al. | 6,244,542 B1 | 6/2001 | Young et al. | |
| 4,834,319 A | 5/1989 | Ewy et al. | 6,293,497 B1 | 9/2001 | Wickemeyer et al. | |
| 4,838,503 A | 6/1989 | Williams et al. | 6,328,265 B1 | 12/2001 | Dizdarevic | |
| 4,854,528 A | 8/1989 | Hofrichter et al. | 6,349,798 B1 | 2/2002 | McKay | |
| 4,856,735 A | 8/1989 | Lotz et al. | 6,349,903 B2 | 2/2002 | Caton et al. | |
| 4,867,394 A | 9/1989 | Patterson, Jr. et al. | 6,364,254 B1 | 4/2002 | May | |
| 4,892,274 A | 1/1990 | Pohl et al. | 6,375,126 B1 | 4/2002 | Sakurai | |
| 4,899,284 A | 2/1990 | Lewis | 6,382,566 B1 | 5/2002 | Ferrel et al. | |
| 4,962,902 A | 10/1990 | Fortes | 6,431,498 B1 | 8/2002 | Watts et al. | |
| 5,039,032 A | 8/1991 | Rudolph | 6,439,512 B1 | 8/2002 | Hart | |
| 5,046,688 A | 9/1991 | Woods | 6,443,394 B1 | 9/2002 | Weisend | |
| 5,050,081 A | 9/1991 | Abbott et al. | 6,450,457 B1 | 9/2002 | Sharp | |
| 5,056,741 A | 10/1991 | Bliesner et al. | 6,464,175 B2 | 10/2002 | Yada et al. | |
| 5,074,495 A | 12/1991 | Raymond | 6,466,141 B1 * | 10/2002 | McKay et al. | 340/963 |
| 5,082,207 A | 1/1992 | Tulinius | 6,478,541 B1 | 11/2002 | Charles et al. | |
| 5,082,208 A | 1/1992 | Matich | 6,481,667 B1 | 11/2002 | Ho | |
| 5,088,665 A | 2/1992 | Vijgen | 6,484,969 B2 | 11/2002 | Sprenger | |
| 5,094,411 A | 3/1992 | Rao | 6,499,577 B2 | 12/2002 | Kitamoto et al. | |
| 5,094,412 A | 3/1992 | Narramore | 6,536,714 B2 | 3/2003 | Gleine et al. | |
| 5,100,082 A | 3/1992 | Archung | 6,547,183 B2 | 4/2003 | Farnsworth | |
| 5,114,100 A | 5/1992 | Rudolph | 6,554,229 B1 | 4/2003 | Lam | |
| 5,129,597 A | 7/1992 | Manthey | 6,561,463 B1 * | 5/2003 | Yount et al. | 244/196 |
| 5,158,252 A | 10/1992 | Sakurai | 6,591,169 B2 | 7/2003 | Jones | |
| 5,167,383 A | 12/1992 | Nozaki | 6,598,829 B2 | 7/2003 | Kamstra | |
| 5,203,619 A | 4/1993 | Welsch | 6,598,834 B2 | 7/2003 | Nettle | |
| 5,207,400 A | 5/1993 | Jennings | 6,601,801 B1 | 8/2003 | Prow | |
| 5,244,269 A | 9/1993 | Harriehausen | 6,622,972 B2 | 9/2003 | Urnes | |
| 5,259,293 A | 11/1993 | Brunner | 6,622,974 B2 | 9/2003 | Dockter et al. | |
| 5,280,863 A | 1/1994 | Schmittle | 6,625,982 B2 | 9/2003 | Van Den Bossche | |
| 5,282,591 A | 2/1994 | Walters et al. | 6,644,599 B2 | 11/2003 | Perez | |
| 5,310,387 A | 5/1994 | Savagian | 6,651,930 B1 | 11/2003 | Gautier et al. | |
| 5,351,914 A | 10/1994 | Nagao | 6,729,583 B2 | 5/2004 | Milliere et al. | |
| 5,388,788 A | 2/1995 | Rudolph | 6,755,375 B2 | 6/2004 | Trikha | |
| 5,441,218 A | 8/1995 | Mueller | 6,796,526 B2 | 9/2004 | Boehringer | |
| 5,474,265 A | 12/1995 | Capbern | 6,796,534 B2 | 9/2004 | Beyer | |
| 5,493,497 A * | 2/1996 | Buus | 701/4 | 6,799,739 B1 | 10/2004 | Jones | |
| 5,535,852 A | 7/1996 | Bishop | 6,802,475 B2 | 10/2004 | Davies et al. | |
| 5,542,684 A | 8/1996 | Squirrell | 6,824,099 B1 | 11/2004 | Jones | |
| 5,544,847 A | 8/1996 | Bliesner | 6,843,452 B1 | 1/2005 | Vassberg et al. | |
| 5,564,655 A | 10/1996 | Garland et al. | 6,860,452 B2 * | 3/2005 | Bacon et al. | 244/194 |
| 5,600,220 A | 2/1997 | Thoraval | 6,870,490 B2 | 3/2005 | Sherry et al. | |
| 5,609,020 A | 3/1997 | Jackson | 6,978,971 B1 | 12/2005 | Dun | |
| 5,680,124 A | 10/1997 | Bedell | 6,981,676 B2 * | 1/2006 | Milliere | 244/213 |
| 5,681,014 A | 10/1997 | Palmer | 7,007,897 B2 | 3/2006 | Wingett et al. | |
| 5,686,907 A | 11/1997 | Bedell | 7,028,948 B2 | 4/2006 | Pitt | |
| 5,735,485 A * | 4/1998 | Ciprian et al. | 244/113 | 7,048,228 B2 | 5/2006 | Vassberg et al. | |
| 5,740,991 A * | 4/1998 | Gleine et al. | 244/203 | 7,048,234 B2 * | 5/2006 | Recksiek et al. | 244/213 |
| 5,743,490 A | 4/1998 | Gillingham | 7,048,235 B2 | 5/2006 | McLean et al. | |
| 5,788,190 A | 8/1998 | Siers | 7,051,975 B2 | 5/2006 | Pohl et al. | |
| 5,839,698 A | 11/1998 | Moppert | 7,051,982 B1 | 5/2006 | Johnson | |
| 5,875,998 A | 3/1999 | Gleine | 7,059,563 B2 | 6/2006 | Huynh | |
| 5,915,653 A | 6/1999 | Koppelman | 2001/0006207 A1 | 7/2001 | Caton et al. | |
| 5,921,506 A | 7/1999 | Appa | 2002/0046087 A1 | 4/2002 | Hey | |
| 5,927,656 A | 7/1999 | Hinkleman | 2002/0100842 A1 | 8/2002 | Perez | |
| 5,934,615 A | 8/1999 | Treichler | 2003/0058134 A1 | 3/2003 | Sherry | |
| 5,984,230 A | 11/1999 | Orazi | 2003/0127569 A1 * | 7/2003 | Bacon et al. | 244/195 |
| 6,015,117 A | 1/2000 | Broadbent | 2003/0132860 A1 | 7/2003 | Feyereisen | |
| 6,033,180 A | 3/2000 | Machida et al. | 2003/0197097 A1 | 10/2003 | Wakayama | |
| 6,045,204 A | 4/2000 | Frazier | 2003/0230677 A1 | 12/2003 | Milliere | |
| 6,073,624 A | 6/2000 | Laurent | 2004/0004162 A1 | 1/2004 | Beyer | |
| 6,076,767 A | 6/2000 | Farley et al. | 2004/0016556 A1 | 1/2004 | Barber | |
| 6,076,776 A | 6/2000 | Breitbach | 2004/0059474 A1 | 3/2004 | Boorman | |
| 6,079,672 A | 6/2000 | Lam et al. | 2004/0195464 A1 | 10/2004 | Vassberg et al. | |
| 6,082,679 A | 7/2000 | Crouch et al. | 2004/0217575 A1 | 11/2004 | Beaujot et al. | |
| 6,109,567 A | 8/2000 | Munoz | 2004/0245386 A1 * | 12/2004 | Huynh | 244/75 R |
| 6,145,791 A | 11/2000 | Diller et al. | 2005/0011994 A1 | 1/2005 | Sakurai et al. | |
| 6,152,405 A | 11/2000 | Muller et al. | 2005/0017126 A1 | 1/2005 | McLean et al. | |
| 6,161,801 A | 12/2000 | Kelm | 2005/0045765 A1 | 3/2005 | Pitt | |
| 6,164,598 A | 12/2000 | Young et al. | 2005/0061922 A1 * | 3/2005 | Milliere | 244/213 |
| 6,173,924 B1 | 1/2001 | Young et al. | 2005/0109876 A1 | 5/2005 | Jones | |
| 6,189,837 B1 | 2/2001 | Matthews | 2005/0151028 A1 | 7/2005 | Pohl et al. | |

| | | | |
|---|---|---|---|
| 2005/0171652 A1 | 8/2005 | Speer | |
| 2005/0224662 A1 | 10/2005 | Lacy et al. | |
| 2005/0242234 A1* | 11/2005 | Mahmulyin | 244/75.1 |
| 2005/0242243 A1* | 11/2005 | Seve | 244/213 |
| 2005/0274847 A1 | 12/2005 | Charron | |
| 2006/0000952 A1 | 1/2006 | Rampton et al. | |
| 2006/0038086 A1 | 2/2006 | Reckzeh | |
| 2006/0049308 A1* | 3/2006 | Good et al. | 244/76 A |
| 2006/0102803 A1 | 5/2006 | Wheaton et al. | |
| 2006/0175468 A1 | 8/2006 | Huynh et al. | |
| 2006/0245882 A1 | 11/2006 | Khan et al. | |

FOREIGN PATENT DOCUMENTS

| | | |
|---|---|---|
| DE | 11 29 379 | 5/1962 |
| EP | 0100775 A1 | 2/1984 |
| EP | 0 103 038 | 3/1984 |
| EP | 0215211 | 3/1987 |
| EP | 0 483 504 A1 | 5/1992 |
| EP | 0 781 704 | 7/1997 |
| EP | 0 947 421 | 10/1999 |
| EP | 1 010 616 A2 | 6/2000 |
| EP | 1338506 | 8/2003 |
| EP | 1462361 | 9/2004 |
| EP | 1 547 917 A1 | 6/2005 |
| FR | 705155 | 6/1931 |
| FR | 984 443 | 7/1951 |
| FR | 56 121 | 9/1952 |
| FR | 57 988 | 9/1953 |
| FR | 58 273 | 11/1953 |
| GB | 1 181 991 | 2/1970 |
| GB | 2 144 688 A | 3/1985 |

OTHER PUBLICATIONS

777 High Lift System, 777 Maintenance Manual, Publication Date: Circa 1994 (1 page).
777 Transmission-Typical, 777 Maintenance Manual, Publication Date: Circa 1994 (1 page).
A320 Hinterkantem-Klappen-Verstell System, Trailing Edge Flap System, SAE Presentation, Publication Date: Circa 1990 (1 page).
A340 Flight Controls, SAE Presentation, Publication Date: Circa 1995 (1 page).
Boeing, 777 Aircraft Maintenance Manual, Sep. 5, 2002 (p. 39).
Drela, M., "Optimization Techniques In Airfoil Design," MIT Aero & Astro, 29 pages.
Drela, Mark, "Design and Optimization Method for Multi-Element Airfoils," MIT Department of Aeronautics and Astronautics, Copyright 1993 American Institute of Aeronautics and Astronautics, Inc. (pp. 1-11).
European Search Report for European Patent Application No. EP 03 07 7840, The Boeing Company, Nov. 4, 2003 (2 pgs).
Flap Drive System, 777 Maintenance Manual, Publication Date: Circa 1994 (1 page).
Flap Transmission and Support, 777 Maintenance Manual, Publication Date: Circa 1994 (1 page).
Hansen, H., "Application of Mini-Trailing-Edge Devices in the Awiator Project," Airbus Deutschland, EGAG, Hunefeldstr. 1-5, D-28199 Bremen, Germany, 9 pages.
Junkers JU 52/3M (2 pages) http://www.wpafb.af.mil/museum/outdoor/od16 [Accessed Aug. 7, 2003].
MOOG, Component Maintenance Manual, May 1994 (2 pages).
Niu, Chen-Yen, Airframe Structural Design, Chen-Yeun Niu, Conmilit Press, 1988 (1 page).
Petrov, A.V., "Certain Types of Separated Flow over Slotted Wings," Fluid Mechanics-Soviet Research, vol. 7, No. 5, Sep.-Oct. 1978, p. 80-89.
The High Speed Frontier, Chapter 2: The High-Speed Airfoil Program, "Supercritical" Airfoils, 1957-1978 (4 pages) http://www.hq.nasa.gov/office/pao/History/SP-445/ch2-5.
TU-144 Canard, (date unknown), 1 pg.
Whitcomb, Richard T., "Review of NASA Supercritical Airfoils," National Aeornautics and Space Administration, Aug. 1974 (pp. 8-18).
Drela, Mark, "Design and Optimization Method for Multi-Element Airfoils," MIT Department of Aeronautics and Astronautics, Copyright 1993 American Institute of Aeronautics and Astronautics, Inc. (pp. 1-11).
"Adaptive Aircraft: No Flight of Fancy? Research into using exotic means of making wings change shpe in-flight looks promising, though still a long way from reality," Business Week Online, Jan. 7, 2003, pp. 1-3.
"Aero-Space Research & Technology," Space Systems, Sep. 1, 2001, pp. 1-28.
"Flap (aircraft)", Wikipedia, The Free Encyclopedia, Aug. 3, 2006, 10:18 UTC. Wikimedia Foundation, Inc. Aug. 5, 2006; http://wn.wikipedia.org/index.pho?title=Flap__%28aircraft%29&oldid=67413665>.
"Slats,", Wikipedia, The Free Encyclopedia. Jun. 27, 2006, 12:323 UTC. Wikimedia Foundation, Inc. Aug. 5, 2006; http://wn.wikipedia.org/w/index.php?title=Slats&oldid=60827639>.
Leaf Spring Retainer Seals; EMP, Inc., 2 pgs.
Morphing Aircraft Structures, "Morphing Aircraft Structures-Raytheon," <<http://www.defense-update.com/products/m/morphing-structures.htm>>, pp. 1-3, [Accessed Aug. 31, 2005].
Morphing Systems, "Morphing Aerostructures—An Overview," <http://www.crgrp.net/morphingsystems.htm>, pp. 1-9, [Accessed Aug. 31, 2005].
Morphing Aircraft Structures, "Morphing Aircraft Structures-The Cellular Approach," http://www.personal.psu.edu/users/d/s/dsr134/mas/Cellular.htm, Penn State University, pp. 1-3 [Accessed Aug. 31, 2005].

* cited by examiner

SYSTEMS AND METHODS FOR CONTROLLING AIRCRAFT FLAPS AND SPOILERS

TECHNICAL FIELD

The present invention is directed generally to systems and methods for controlling aircraft flaps and spoilers.

BACKGROUND

Current commercial transport aircraft typically include deployable high lift devices that change the aircraft wing shape depending on flight conditions. These devices can include leading edge flaps and/or slats, and trailing edge flaps that are extended to increase lift during takeoff and landing, and stowed during cruise to reduce aircraft drag. Commercial transport aircraft can also include spoilers to selectively reduce lift during descent, landing, roll maneuvers and aborted takeoffs.

FIG. 1A is a partially schematic, cross-sectional illustration of a wing 110 configured in accordance with the prior art. The wing 110 can include a trailing edge 111, a forward flap 120a extending aft of the trailing edge 111, and an aft flap 120b extending aft of the forward flap 120a. A mechanical linkage arrangement 122 couples the forward flap 120a and the aft flap 120b to an actuator 121. FIG. 1B illustrates the aircraft wing 110 with the forward flap 120a and the aft flap 120b deployed to produce a high lift configuration. In this configuration, the flaps 120a, 120b can form a forward flap gap 124a and an aft flap gap 124b that provide for controlled, attached flow over the forward flap 120a and the aft flap 120b, respectively. Accordingly, this double-slotted wing configuration can effectively provide high lift for a large transport aircraft during takeoff and landing (when the flaps 120 are deployed) and can have a substantially reduced impact on aircraft drag (when the flaps 120 are stowed).

One potential drawback with the wing 110 shown in FIGS. 1A and 1B is that the mechanical linkage arrangement 122 is relatively complex and can therefore be heavy and somewhat costly to build and operate. Accordingly, other less complex arrangements have also been developed for providing large aircraft with a high lift capability. One such arrangement is disclosed in U.S. Pat. No. 4,120,470, assigned to the assignee of the present invention. The '470 patent discloses a single trailing edge flap and a spoiler that controls the size of the gap between the single trailing edge flap and the wing. This arrangement is simpler than the arrangement described above with reference to FIGS. 1A and 1B because the single flap requires fewer moving parts than a double flap arrangement. However, this arrangement employs a flexible panel and a spoiler actuator that is integrated with the flap actuation mechanism. In some cases, these features can increase system complexity and weight, while reducing system versatility.

SUMMARY

The present invention is directed generally toward systems and methods for controlling aircraft flaps and spoilers. A system in accordance with one aspect of the invention includes a wing having a trailing edge, and a flap positioned proximate to the wing trailing edge. The flap can be deployable relative to the wing between a first flap position and a second flap position as a result of action by a first actuator. The system can further include a spoiler positioned at least proximate to the flap, with the spoiler being movable among at least three positions, including a first spoiler position in which the spoiler forms a generally continuous contour with an upper surface of the wing, a second spoiler position in which the spoiler is deflected downwardly from the first spoiler position, and a third spoiler position in which the spoiler is deflected upwardly from the first spoiler position. A second actuator can be operatively coupled to the spoiler to move the spoiler among the first, second and third spoiler positions, mechanically independently of the motion of the flap. In a further aspect of the invention, a controller can be operatively coupled to the first and second actuators. In still a further aspect, the spoiler can be pivotably coupled to the wing without a flexible panel engaged with the wing and the spoiler.

The invention is also directed toward methods for operating an aircraft wing system. In one embodiment, such a method includes placing the wing in a high lift configuration by deflecting a flap downwardly to form a gap with a trailing edge of the wing, and deflecting a spoiler downwardly to form a gap with the flap, without mechanically tying the motion of the flap to the motion of the spoiler. The method can further include placing the wing in a speed brake configuration by deflecting the flap downwardly and deflecting the spoiler upwardly, again without mechanically tying the motion of the flap to the motion of the spoiler. In further aspects of the invention, the method can further include directing electromagnetic signals via a non-mechanical link from a controller to a first actuator coupled to the flap and to a second actuator coupled to the spoiler.

DETAILED DESCRIPTION

The present disclosure describes systems and methods for controlling aircraft flaps and spoilers, including an arrangement in which actuation of the flaps is mechanically independent of actuation of the spoilers. Certain specific details are set forth in the following description and in FIGS. 2-6 to provide a thorough understanding of various embodiments of the invention. Well-known structures, systems and methods often associated with the systems have not been shown or described in detail to avoid unnecessarily obscuring the description of the various embodiments of the invention. In addition, those of ordinary skill in the relevant art will understand that additional embodiments of the invention may be practiced without several of the details described below.

Many embodiments of the invention described below may take the form of a controller that includes computer-executable instructions, including routines executed by a programmable computer or, alternatively, a non-programmable electronic device. Those skilled in the relevant art will appreciate that the invention can be practiced on computer systems or controllers other than those shown and described below. The invention can be embodied in a special-purpose computer, controller or data processor that is specifically programmed, configured or constructed to perform one or more of the computer-executable instructions described below. Accordingly, the controller or other computer device can include any of a wide variety of data processors that are configured to execute computer-executable instructions. Information corresponding to these controllers may be presented at any suitable display medium, including a CRT display or LCD.

Figure 1A:
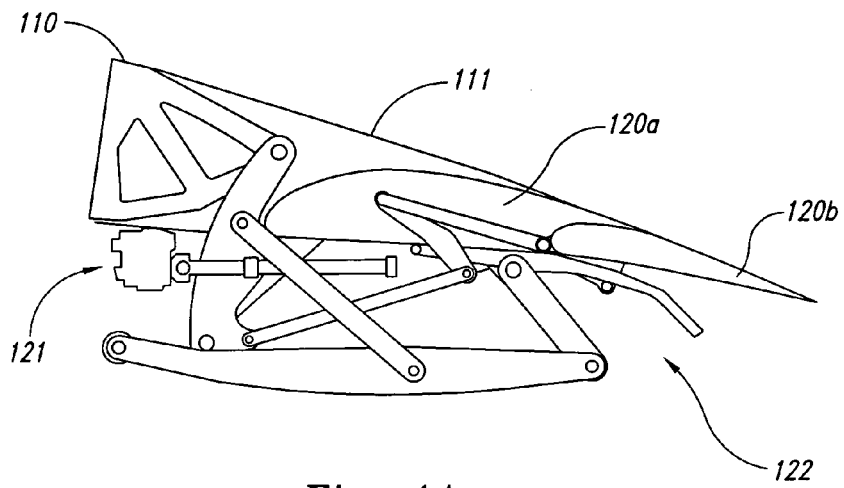
FIGS. 1A and 1B illustrate a wing having flaps configured in accordance with the prior art.
Figure 1B:
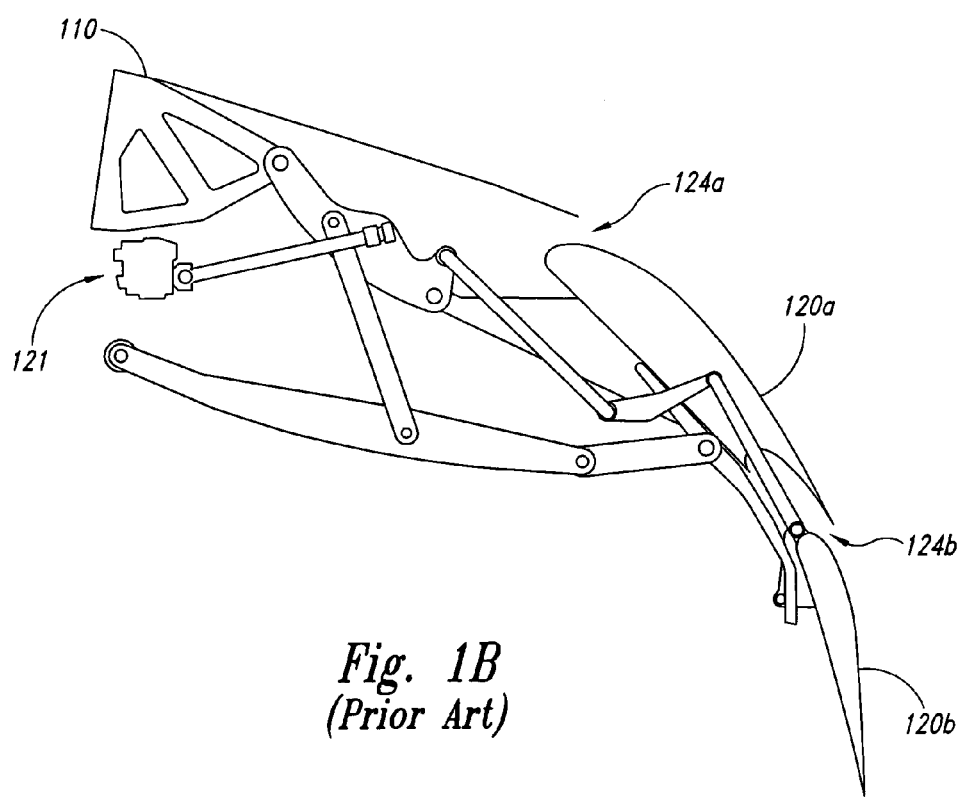
Figure 2:
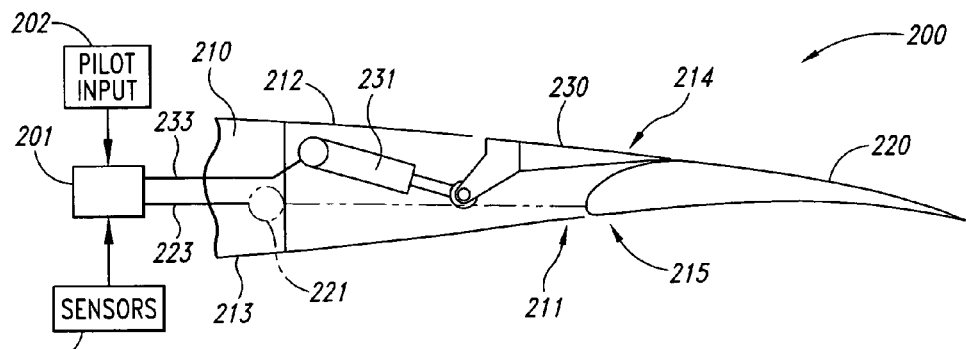
FIG. 2 is a partially schematic, cross-sectional illustration of a wing having a flap and spoiler that are actuatable without being mechanically tied to each other.

FIG. 2 is a partially schematic, cross-sectional view of a system 200 for controlling aircraft lift and drag, in accordance with an embodiment of the invention. In one aspect of this embodiment, the system 200 can include a wing 210 having an upper surface 212 and a lower surface 213 with a fixed trailing edge 211. A flap 220 is positioned proximate to the trailing edge 211, and a spoiler 230 is positioned on the upper surface 212 proximate to the flap 220. The spoiler 230 can be moved among a variety of positions by a spoiler actuator 231 that is coupled to the spoiler 230. A controller 201 controls the actuation of the spoiler actuator 231 by transmitting signals along a spoiler signal link 233. In a particular aspect of this embodiment, the spoiler signal link 233 is a non-mechanical link (e.g., an electrical cable, optical cable, or other link configured to transmit electromagnetic signals between the controller 201 and the spoiler actuator 231). The controller 201 can receive pilot inputs 202 from a pilot or other aircraft operator and can receive further inputs from one or more sensors 205. The pilot inputs 202 can include (but are not limited to) a commanded flap setting, a commanded spoiler setting (e.g., a commanded speed brake input), and a commanded bank angle. The sensors 205 can provide an indication of flap position and/or flap skew (e.g., the extent to which any flap deploys to a non-commanded setting, in particular, relative to a neighboring flap), and/or other relevant data. Based on inputs from the pilot and/or the sensors 205, the controller 201, can direct the motion of the spoiler 230 via the spoiler actuator 231.

The flap 220 can be actuated and controlled in a manner generally similar to that described above with reference to the spoiler 230. Accordingly, the system 200 can include a flap actuator 221 coupled to the flap 220 with a flap coupling 222. The sectional cut shown in FIG. 2 is taken through the spoiler actuator 231 but not through the flap actuator 221, which is offset from the spoiler actuator 231 in a spanwise direction and is accordingly shown in dashed lines in FIG. 2. Further details of the flap actuator 221 are provided below with reference to FIG. 3B. The flap actuator 221 can also be coupled to the controller 201 via a flap signal link 223 (e.g., a non-mechanical link). Accordingly, the controller 201 can independently control the motion of the spoiler actuator 231 and the flap actuator 221 to produce a desired wing shape. In some embodiments, the motion of the flap 220 and the spoiler 230 may be coordinated by the controller 201, but the motion of one need not be dependent on the motion of the other, and, accordingly, the flap 220 and the spoiler 230 need not be connected to each other by a deployable mechanical linkage.

FIG. 2 illustrates the flap 220 and the spoiler 230 in a cruise or neutral position. In this position, the spoiler 230 and the upper surface of the flap 220 form a generally smooth upper contour 214 with the upper surface 212 of the wing. The lower surface of the flap 220 forms a generally smooth lower contour 215 with the lower surface 213 of the wing 210.

Figure 3A:
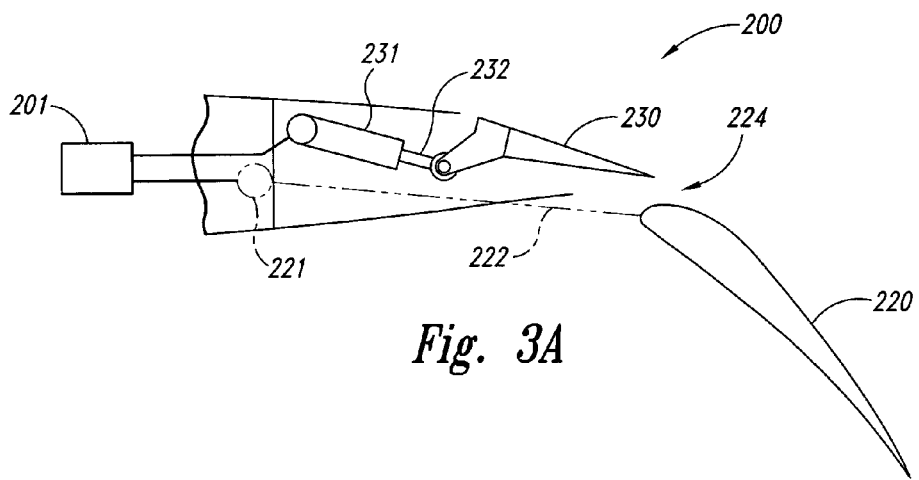
FIGS. 3A and 3B illustrate the wing shown in FIG. 2 with the flap deployed to a high lift setting.

FIG. 3A illustrates the system 200 with the flap 220 and the spoiler 230 deployed to a high lift configuration. In this configuration, the flap actuator 221 moves the flap 220 downwardly from the position shown in FIG. 2. The spoiler actuator 231 moves the spoiler 230 downwardly relative to the position shown in FIG. 2 so as to control the size of a gap 224 between the spoiler 230 and the flap 220. In this position, the spoiler 230 guides the flow of air passing over the upper surface of the wing 212 while the size of the gap 224 regulates the amount of airflow from the wing lower surface 213 to the upper surface so that the air remains attached to the airfoil surfaces as it flows over the flap 220. The gap 224 can have a size and location selected to produce optimal or conditionally optimal fluid flow over the flap 220. To achieve the selected gap size, the controller 201 can direct the spoiler 230 to move in accordance with a predetermined schedule that is based on the position of the flap 220. The controller 201 can receive an indication of the flap position from one or more of the sensors 205 (which can include a flap position sensor).

The sensors 205 can be configured to detect flap position, as described above, and/or other system parameters, including flap skew. Flap skew refers generally to a condition in which at least one end of the flap does not move to its commanded position. If the condition is detected, the system 200 can automatically prevent movement of any spoilers 230 located just forward of the affected flap 220. Accordingly, if a particular flap 220 does not move all the way to a commanded downward deployment, the associated spoilers 230 can be prevented from moving downwardly by an amount that would cause mechanical interference between the flap 220 and the spoilers 230.

Referring now to FIGS. 2 and 3A together, the flap actuator 221 can be activated to move the flap 220 back to the position shown in FIG. 2. During normal operation, signals are transmitted to both the flap actuator 221 and the spoiler actuator 231 so that the flap 220 and the spoiler 230 retract without interfering with each other. In one respect of this embodiment, the system 200 can be configured to allow this motion even if, for some reason, retraction signals fail to be transmitted to the spoiler actuator 231. For example, the spoiler actuator 231 can be "back driven," a mode of operation during which the flap 220 makes physical contact with the spoiler 230 and pushes the spoiler 230 to its retracted position as the flap 220 moves to its retracted position. If the spoiler actuator 231 is hydraulically driven, it can include a release valve that releases hydraulic pressure applied to the spoiler 230 and allows the spoiler 230 to be back driven without interference from the spoiler actuator 231. If the spoiler actuator 231 is mechanically driven (e.g., via a leadscrew), it can include a clutch device that allows the spoiler 230 to be back driven without interference from the spoiler actuator 231. In other embodiments, other types of spoiler actuators can include corresponding release mechanisms. In any of these embodiments, this arrangement can reduce or eliminate the mechanical ties between the flap 220 and the spoiler 230, without exposing the flap 220 to interference by the spoiler 230 in the event of a signal failure.

Figure 3B:
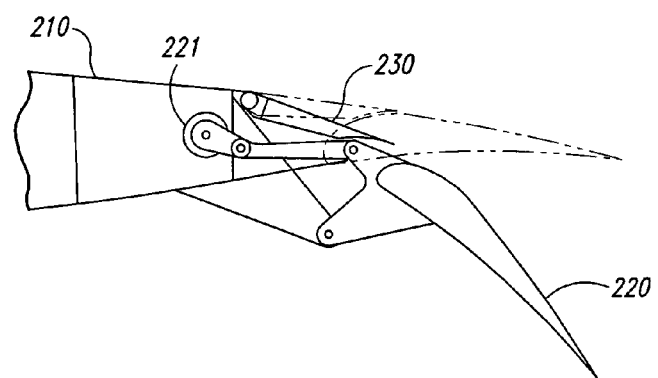

FIG. 3B is a cross-sectional illustration of the wing 210 taken at a slightly different spanwise location than that shown in FIG. 3A, so as to pass through the flap actuator 221. The flap actuator 221 can include one or more mechanical links coupled to the flap 220. As was described above, the flap actuator 221 and associated coupling with the flap 220 can be mechanically independent of the spoiler actuator 231 and associated coupling with the spoiler 230 (FIG. 2).

Figure 4:
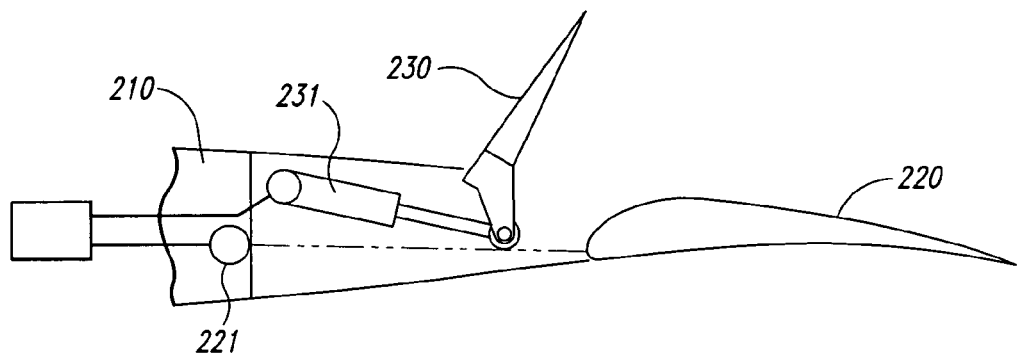
FIG. 4 illustrates the wing shown in FIG. 2 with the spoiler deployed to a speed brake and/or roll control position.

FIG. 4 is a cross-sectional illustration of the wing 210 taken at substantially the same sectional location shown in FIG. 2, with the spoiler 230 deployed upwardly in accordance with an embodiment of the invention. In one aspect of this embodiment, the spoiler 230 can be positioned upwardly to act as a speed brake (or other aircraft control device) during aircraft flight, while the flap 220 remains in the cruise or neutral position. Accordingly, spoilers 230 located on opposite sides of the aircraft longitudinal centerline can be deployed by the same amount to provide an aerodynamic braking effect, without inducing a yaw or roll moment. In other embodiments, spoilers 230 located on one side of the aircraft longitudinal centerline can be deployed while spoilers 230 positioned on the opposite side of the aircraft centerline can remain undeployed, or can be deployed to a lesser degree, to produce a yaw and/or rolling moment that assists the pilot in turning the aircraft.

Figure 5:
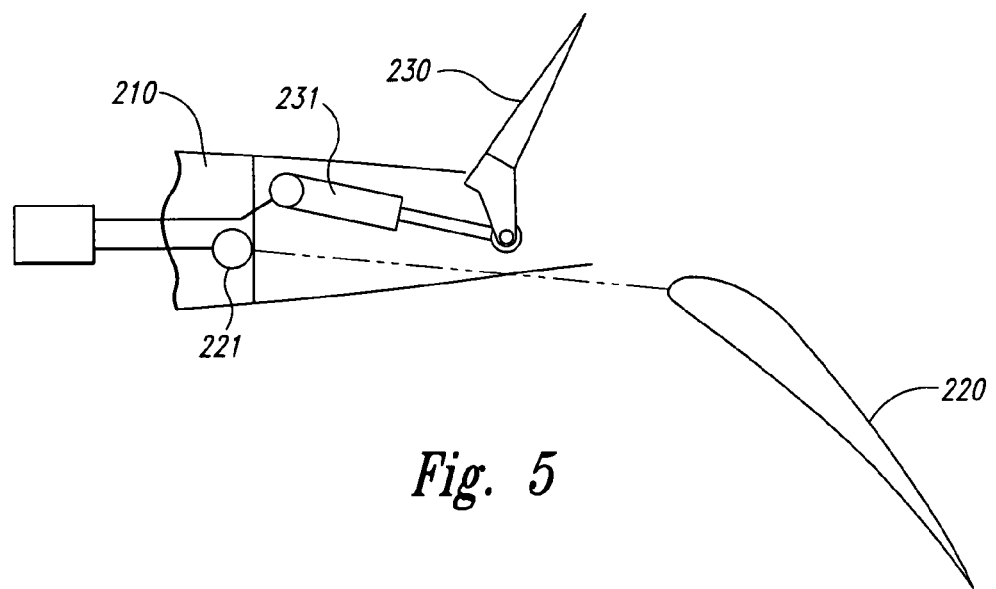
FIG. 5 illustrates the wing shown in FIG. 2 with the flap extended and the spoiler deployed to a speed brake configuration.

FIG. 5 is a cross-sectional illustration of the wing 210, with the flap 220 positioned in a high lift configuration, and the spoiler 230 positioned in a speed brake or ground spoiler configuration. This combination of flap and spoiler settings may be used to reduce aircraft speed and on-ground aerodynamic lift shortly after the aircraft has touched down during a landing maneuver. A similar combination of flap and spoiler settings may be used to reduce aircraft speed and on-ground aerodynamic lift during a rejected take-off maneuver. Accordingly, the flap 220 and the spoiler 230 can be deployed in opposite directions to produce a braking effect while the flap 220 is extended.

Figure 6:
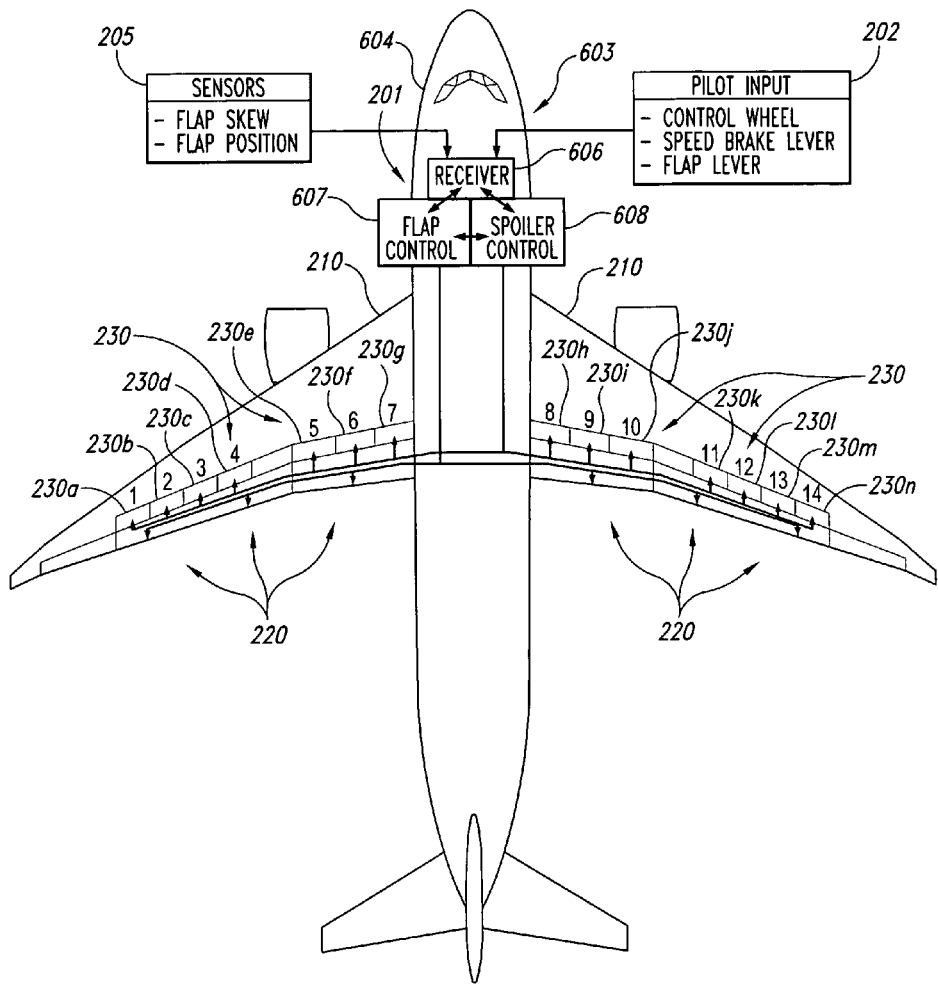
FIG. 6 is a partially schematic plan view of an aircraft that includes a controller and wings configured generally similarly to those described above with reference to FIGS. 2-5.

FIG. 6 is an isometric illustration of an aircraft 603 having wings 210, each of which includes a plurality of flaps 220 and spoilers 230, generally similar to those described above. The aircraft 603 can further include a flight deck 604 from which pilot inputs 202 are directed to the controller 201. The controller 201 can then direct signals to the flaps 220 and the spoiler 230, in a symmetric fashion (e.g., to provide uniform high lift and speed braking effects) and/or in an antisymmetric fashion (to provide roll and/or yaw moments), as described above.

In a particular aspect on an embodiment shown in FIG. 6, the controller 201 can include a receiver portion 606 that receives the pilot inputs 202 and signals from the sensors 205. The controller 201 can also include a flap controller portion 607 and a spoiler controller portion 608 that can operate in a coordinated fashion to direct the appropriate signals to the flaps 220 and the spoilers 230.

Individual spoilers 230 can be actuated by the same or different types of actuators, depending upon the particular installation. For example, the aircraft 603 can include fourteen spoilers (identified by reference numerals 230a-230n), with some spoilers (e.g., spoilers 230d, 230e, 230j and 230k) driven by electric actuators, and the remaining spoilers driven by hydraulic actuators. At least some (and in at least one embodiment, all) of the spoilers 230 can be mechanically de-coupled from the adjacent flaps 220, and can accordingly have a simplified actuation arrangement, as described above. Furthermore, the simplified mechanical arrangement (e.g., separately actuated flap and spoiler couplings) can more easily fit within the thickness of the wing 210. Accordingly, the fairings that house the mechanical couplings between spoilers and flaps in some conventional arrangements can be eliminated, which reduces aircraft weight and drag.

In a particular embodiment, the functions provided by the controller 201 can be distributed. Accordingly, the controller 201 can include a central or federated controller (located, for example, in the fuselage of the aircraft 603) and a plurality of local controllers (e.g., with one local controller 201b associated with each flap actuator and each spoiler actuator). The central controller can be a digital controller that transmits digital signals over a digital bus. Each local controller can include a digital/analog converter to provide analog signals to the corresponding actuator.

Another feature of embodiments of the systems described above is that they can include a single flap 220 at each spanwise location to provide high lift during aircraft maneuvers that require this capability (e.g., during, landing, and take off). An advantage of this arrangement is that a single flap 220, with a single forward gap 224, has fewer parts than a double slotted flap and can accordingly be simpler and less expensive both to install and maintain, in addition to being lighter weight. Accordingly, this arrangement can reduce aircraft purchase and operation costs.

Another feature of embodiments of the systems described above is that they can include separate actuators for the spoiler 230 and the flap 220. In a further aspect of this embodiment, actuation of one device (e.g., the flap 220) does not affect the motion of the other (e.g., the spoiler 230) during normal operation. This is unlike some existing devices, where at least part of the motion of the spoiler is directly mechanically tied to motion of the flap. Accordingly, unlike these conventional systems, embodiments of the present invention can provide an increased level of operational flexibility by allowing the flaps 220 and spoilers 230 to be deployed to any position without necessarily requiring a corresponding motion by the other device.

In some embodiments, the operation of the flap 220 and the spoiler 230 can be coordinated, e.g., when such coordination produces an aerodynamically beneficial effect. In these embodiments, the programmable controller 201 can provide the necessary coordination via an electromagnetic link to the spoiler actuator 231 and the flap actuator 221. An advantage of this "fly by wire" arrangement is that it can reduce the mechanical complexity of the wing system, which can in turn reduce both the initial costs of producing the system and the cost of maintaining the system over time. As a result, operation of an aircraft that includes the wing system can be more efficient than operation of existing aircraft systems.

Still a further advantage of features described above is that the reduction in parts can lead not only to a reduction in fabrication and maintenance costs, but also to a reduction in overall aircraft weight. An additional factor that can contribute to this advantage is that the system need not include a flexible panel to seal the gap between the spoiler and the wing. In particular, the spoiler can be configured to move by an amount sufficient to control the gap aft of the spoiler, but not by such a large amount that the gap forward of the spoiler (e.g., between the spoiler and the trailing edge of the wing) must be sealed. By eliminating the need for a flexible panel, this arrangement can further reduce the part count, cost, and weight of the aircraft. As the weight of the aircraft is reduced, the overall operating costs (e.g., fuel costs) can be reduced, which results in still a further efficiency associated with the system.

From the foregoing, it will be appreciated that specific embodiments of the invention have been described herein for purposes of illustration, but that various modifications may be made without deviating from the spirit and scope of the invention. Aspects of the invention described in the context of particular embodiments may be combined or eliminated in other embodiments. Although advantages associated with certain embodiments of the invention have been described in the context of those embodiments, other embodiments may also exhibit such advantages. Additionally, none of the foregoing embodiments need necessarily exhibit such advantages to fall within the scope of the invention. Accordingly, the invention is not limited except as by the appended claims.

We claim:

1. An aircraft wing system, comprising:
a wing having a trailing edge;
a flap positioned proximate to the wing trailing edge and being deployable relative to the wing between a first flap position and a second flap position;
a first actuator operatively coupled to the flap to move the flap between the first flap position and the second flap position;
a spoiler positioned at least proximate to the flap, the spoiler being movable among at least three positions including a first spoiler position in which the spoiler forms a generally continuous contour with an upper surface of the wing, a second spoiler position in which the spoiler is deflected downwardly from the first spoiler position, and a third spoiler position in which the spoiler is deflected upwardly from the first spoiler position;
a second actuator operatively coupled to the spoiler to move the spoiler among the first, second and third spoiler positions mechanically independently of the motion of the flap; and
a controller operatively coupled to the first and second actuators, wherein the controller is configured to direct the spoiler, independently of the flap, to the first spoiler position during cruise, the second spoiler position during take-off and landing, and the third spoiler position during speed-braking and roll maneuvers.

2. The system of claim 1 wherein the second actuator is connected to the wing and includes a coupling connected to the spoiler, and wherein the wing does not include a fairing that houses the coupling.

3. The system of claim 1 wherein the flap is mechanically coupled to the wing, and the spoiler is mechanically coupled to the wing, but the spoiler is not mechanically connected directly to the flap.

4. The system of claim 1 wherein the second actuator is configured to release a force applied to the spoiler allowing the spoiler to be driven by direct mechanical contact with the flap from the second spoiler position to the first spoiler position as the flap moves from the second flap position to the first flap position.

5. The system of claim 1 wherein the wing has a trailing edge and a chord line and wherein the flap is a single flap positioned proximate to the wing trailing edge at the chord line.

* * * * *

UNITED STATES PATENT AND TRADEMARK OFFICE
CERTIFICATE OF CORRECTION

PATENT NO. : 7,338,018 B2
APPLICATION NO. : 11/051738
DATED : March 4, 2008
INVENTOR(S) : Huynh et al.

It is certified that error appears in the above-identified patent and that said Letters Patent is hereby corrected as shown below:

On page 4, under "Other Publications", in column 2, line 12, delete "Mechanics-Soviet" and insert -- Mechanics–Soviet --, therefor.

On page 4, under "Other Publications", in column 2, line 19, delete "Aeornautics" and insert -- Aeronautics --, therefor.

On page 4, under "Other Publications", in column 2, line 26, delete "shpe" and insert -- shape --, therefor.

Signed and Sealed this

Twenty-third Day of February, 2010

David J. Kappos
*Director of the United States Patent and Trademark Office*